United States Patent
Kwak et al.

(10) Patent No.: US 12,035,203 B2
(45) Date of Patent: Jul. 9, 2024

(54) METHOD FOR TERMINAL TO TRANSMIT FIRST MESSAGE IN WIRELESS COMMUNICATION SYSTEM SUPPORTING SIDELINK, AND DEVICE FOR SAME

(71) Applicant: LG ELECTRONICS INC., Seoul (KR)

(72) Inventors: Minsung Kwak, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/619,869

(22) PCT Filed: Jun. 30, 2020

(86) PCT No.: PCT/KR2020/008504
§ 371 (c)(1),
(2) Date: Dec. 16, 2021

(87) PCT Pub. No.: WO2021/002651
PCT Pub. Date: Jan. 7, 2021

(65) Prior Publication Data
US 2022/0360941 A1 Nov. 10, 2022

(30) Foreign Application Priority Data

Jul. 4, 2019 (KR) .......................... 10-2019-0080596

(51) Int. Cl.
*H04W 4/029* (2018.01)
*H04W 4/40* (2018.01)
*H04W 72/20* (2023.01)

(52) U.S. Cl.
CPC ............. *H04W 4/029* (2018.02); *H04W 4/40* (2018.02); *H04W 72/20* (2023.01)

(58) Field of Classification Search
CPC ........ H04W 4/029; H04W 4/40; H04W 72/20
See application file for complete search history.

(56) References Cited

U.S. PATENT DOCUMENTS

2018/0053416 A1   2/2018  Sanji et al.
2022/0109527 A1*  4/2022  Hwang ................. H04W 72/23
(Continued)

FOREIGN PATENT DOCUMENTS

KR        20090022923 A  *  3/2009
KR        1020100051885 A    5/2010
(Continued)

*Primary Examiner* — Adam D Houston
(74) *Attorney, Agent, or Firm* — BRYAN CAVE LEIGHTON PAISNER LLP

(57) ABSTRACT

The Disclosed are a method for a UE to transmit a first message in a wireless communication system supporting sidelink, and a device for same according to various embodiments. The method for transmitting a first message includes the steps of: measuring location information pertaining to the UE and transmitting the first message; receiving a second message; and determining whether to stop the transmission of the first message on the basis of the location information and the second message, wherein, when information about a specific area is included in the second message that is received with a reception strength equal to or greater than a first reference threshold, the UE estimates whether a vehicle is occupied on the basis of the acquired specific area and the location information, and stops the transmission of the first message on the basis of the estimation of vehicle occupancy.

12 Claims, 28 Drawing Sheets

(56) References Cited

U.S. PATENT DOCUMENTS

| | | | |
|---|---|---|---|
| 2022/0248375 A1* | 8/2022 | Baek | H04W 72/56 |
| 2022/0248387 A1* | 8/2022 | Park | H04W 4/40 |
| 2022/0337355 A1* | 10/2022 | Do | H04L 5/0055 |
| 2022/0346000 A1* | 10/2022 | Baek | H04L 5/0048 |
| 2022/0361069 A1* | 11/2022 | Zhang | H04W 72/23 |
| 2022/0361137 A1* | 11/2022 | Baek | H04L 5/0078 |
| 2022/0361142 A1* | 11/2022 | Ko | H04W 28/26 |
| 2022/0365163 A1* | 11/2022 | Baek | H04W 4/40 |
| 2022/0369417 A1* | 11/2022 | Park | H04W 28/0268 |
| 2022/0385423 A1* | 12/2022 | Ko | G01S 5/0072 |
| 2022/0386093 A1* | 12/2022 | Baek | H04W 56/00 |
| 2022/0397633 A1* | 12/2022 | Baek | H04W 72/20 |
| 2022/0407647 A1* | 12/2022 | Baek | H04L 5/0053 |
| 2022/0416976 A1* | 12/2022 | Baek | H04W 72/51 |
| 2022/0417854 A1* | 12/2022 | Park | H04W 52/028 |
| 2023/0003827 A1* | 1/2023 | Ko | G01S 5/0236 |
| 2023/0053304 A1* | 2/2023 | Thomas | G01S 13/878 |
| 2023/0062805 A1* | 3/2023 | Baek | H04W 64/00 |
| 2023/0076030 A1* | 3/2023 | Baek | H04W 24/10 |
| 2023/0101824 A1* | 3/2023 | Baek | H04W 4/40 455/522 |
| 2023/0109359 A1* | 4/2023 | Back | H04L 27/26 370/329 |
| 2023/0127945 A1* | 4/2023 | Ko | G01S 5/0236 455/456.1 |
| 2023/0152420 A1* | 5/2023 | Ko | H04W 64/00 455/456.1 |
| 2023/0221397 A1* | 7/2023 | Baek | G01S 5/0063 455/456.1 |
| 2023/0239957 A1* | 7/2023 | Fujishiro | H04W 52/0216 |
| 2023/0319761 A1* | 10/2023 | Baek | H04L 5/0051 455/456.1 |
| 2023/0328582 A1* | 10/2023 | Zhang | H04W 24/08 370/235 |
| 2023/0328686 A1* | 10/2023 | Edge | H04W 64/00 455/456.1 |
| 2023/0337171 A1* | 10/2023 | Baek | H04W 72/12 |
| 2023/0397150 A1* | 12/2023 | Baek | H04L 5/0094 |

FOREIGN PATENT DOCUMENTS

| | | | | |
|---|---|---|---|---|
| KR | 1020130070781 A | 6/2013 | | |
| KR | 1020140121854 A | 10/2014 | | |
| WO | WO-2015133181 A1 * | 9/2015 | | G08G 1/0112 |
| WO | 2017022881 A1 | 2/2017 | | |

* cited by examiner

FIG. 9
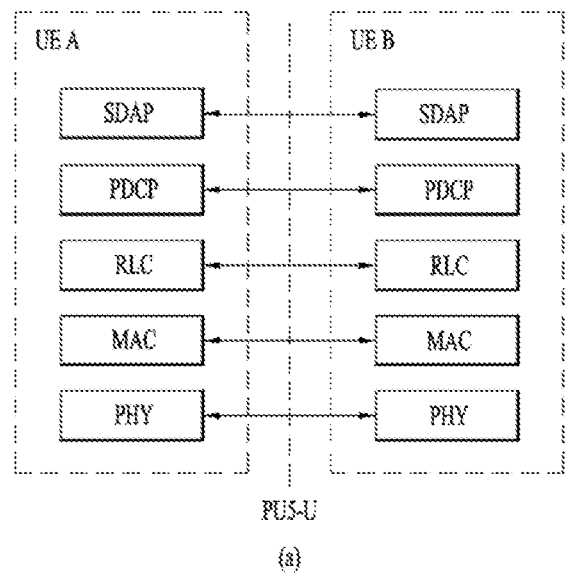
(a)
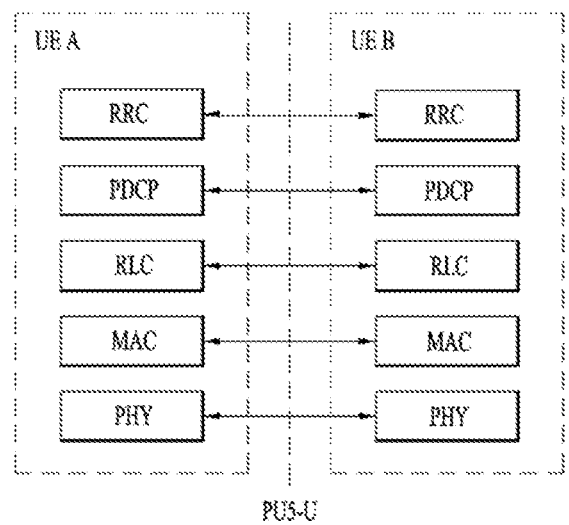
(b)

FIG. 13
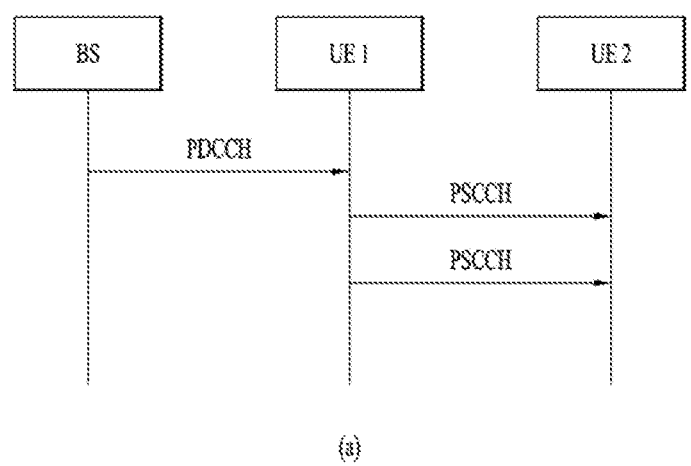
(a)
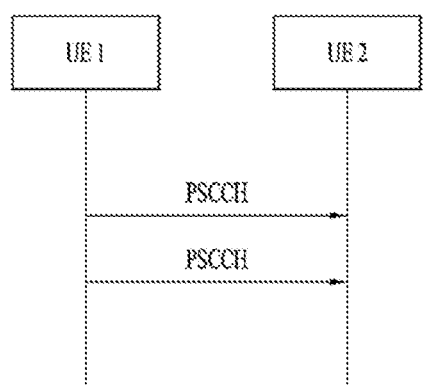
(b)

FIG. 18
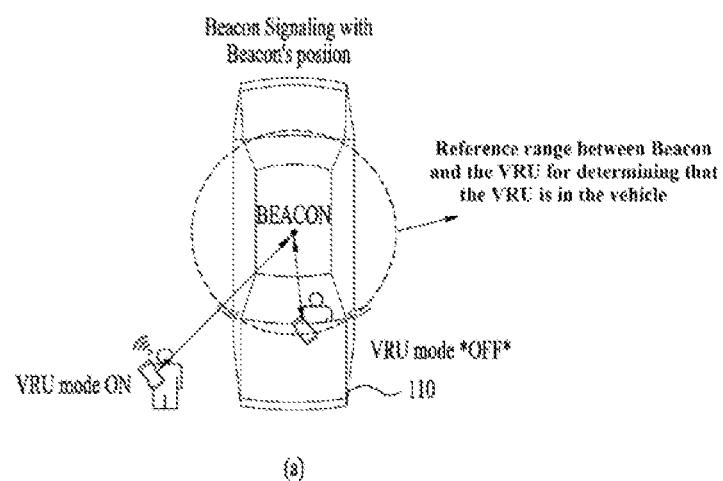
(a)
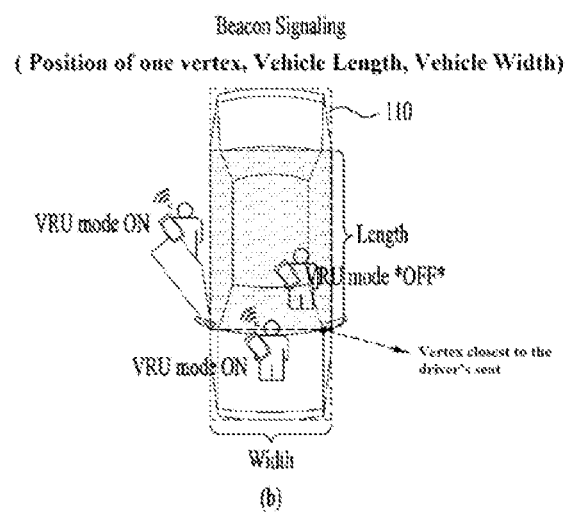
(b)

METHOD FOR TERMINAL TO TRANSMIT FIRST MESSAGE IN WIRELESS COMMUNICATION SYSTEM SUPPORTING SIDELINK, AND DEVICE FOR SAME

This application is the National Stage filing under 35 U.S.C. 371 of International Application No. PCT/KR2020/008504 filed on Jun. 30, 2020, which claims priority to Korean Patent Application No. 10-2019-0080596 filed on Jul. 4, 2019, the contents of which are all hereby incorporated by reference herein in their entirety.

TECHNICAL FIELD

The present disclosure relates to a method and device for transmitting a first message, which is a sidelink signal, by a terminal in a wireless communication system supporting a sidelink, and more particularly, to a method for determining whether to transmit the first message by estimating whether a vehicle is boarded, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and a device for stopping unnecessary transmission of a safety message when a UE detects boarding of a vehicle such that the increase in communication traffic and the power consumption of the UE caused by the unnecessary transmission of the safety message are minimized.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

In one aspect of the present disclosure, a method for transmitting a first message by a user equipment (UE) in a wireless communication system supporting a sidelink may include measuring position information related to the UE and transmitting the first message, receiving a second message, and determining whether to stop transmission of the first message based on the position information and the second message, wherein, on a basis that information on a specific area is included in the second message received with a reception strength greater than or equal to a first reference threshold, the UE may estimate whether a vehicle is boarded based on the specific area and the position information, and stop the transmission of the first message based on the estimation of the boarding of the vehicle.

Alternatively, on a basis that the measured position information belongs to the specific area, the UE may estimate that the vehicle is boarded and stops the transmission of the first message.

Alternatively, on a basis that the estimation of the boarding of the vehicle is maintained based on second messages repeatedly received for a preset time after the boarding of the vehicle is estimated, the transmission of the first message may be stopped.

Alternatively, the UE may determine whether the estimation of the boarding of the vehicle is maintained, additionally considering whether the second messages include the same beacon ID and whether movement of the vehicle is detected from the second messages.

Alternatively, the transmission on the first sidelink may be stopped when the boarding of the vehicle is estimated a predetermined number of times based on second messages repeatedly received for a preset time.

Alternatively, the second messages may include the same beacon ID.

Alternatively, the information on the specific area includes information on a reference position and a reference range, wherein the reference position may be determined based on a size of the vehicle transmitting the second message or a boarding area of the vehicle.

Alternatively, the method may further include determining whether to resume the transmission of the first message based on a third message, the third message being the second message received after the transmission of the first message is stopped, Alternatively, on a basis that the third message is not received for a preset threshold time, the transmission of the first message may be resumed.

Alternatively, on a basis that the position information does not belong to the specific area specified based on the reference position and the reference range included in the third message, the transmission of the first message may be resumed.

Alternatively, on a basis that a difference between the reference positions included in each of the sequentially received third messages is greater than or equal to a preset distance threshold, the transmission of the first message may not be resumed even when the third message including information on a specific area to which the position information does not belong is received.

Alternatively, on a basis that the third message is received with a reception strength greater than a second reference threshold, the transmission of the first message may not be resumed even when the third message including information on a specific area to which the position information does not belong is received.

Alternatively, the first message may include a personal safety message (PSM), and the second message may be a vehicle beacon including a reference position and a reference range.

In another aspect of the present disclosure, a user equipment (UE) for transmitting a safety message in a wireless communication system supporting a sidelink may include a radio frequency (RF) transceiver, and a processor connected to the RF transceiver, wherein the processor is configured to measure position information related to the UE, control the RF transceiver to transmit a first message including the position information and receive a second message, determine whether to stop transmission of the first message based on the position information and the second message, when information on a specific area is included in the second message received with a reception strength greater than or equal to a first reference threshold, estimate whether a vehicle is boarded based on the acquired specific area and the position information, and stop the transmission of the first message based on the estimation of the boarding of the vehicle.

In another aspect of the present disclosure, a chipset for transmitting a safety message in a wireless communication system supporting a sidelink may include at least one processor, and at least one memory operatively coupled to the at least one processor and configured to cause, when executed, the at least one processor to perform an operation, the operation including measuring position information related to the UE, transmitting a first message including the position information, receiving a second message, determining whether to stop transmission of the first message based on the position information and the second message, when information on a specific area is included in the second message received with a reception strength greater than or equal to a first reference threshold, estimating whether a vehicle is boarded based on the acquired specific area and the position information, and stopping the transmission of the first message based on the estimation of the boarding of the vehicle.

Alternatively, the processor may control a driving mode of a device connected to the chipset based on the specific area.

Advantageous Effects

According to various embodiments, unnecessary transmission of a safety message may be stopped when a UE detects boarding of a vehicle, thereby minimizing the increase in communication traffic and the power consumption of the UE caused by unnecessary transmission of the safety message.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are

FIG. 9 illustrates a radio protocol architecture for SL communication.

FIG. 13 illustrates a procedure in which UEs perform V2X or SL communication according to a transmission mode.

FIG. 18 illustrates information included in a beacon transmitted from a vehicle.

MODE FOR DISCLOSURE

Figure 1:
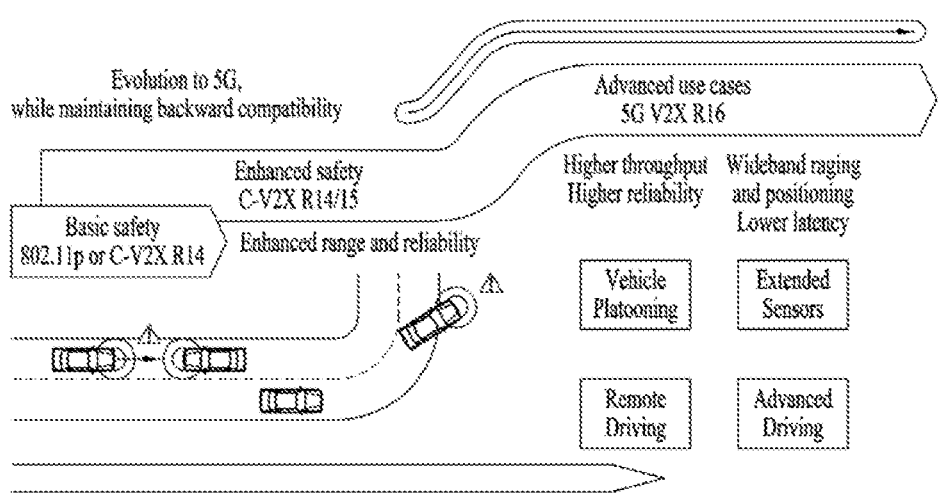
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
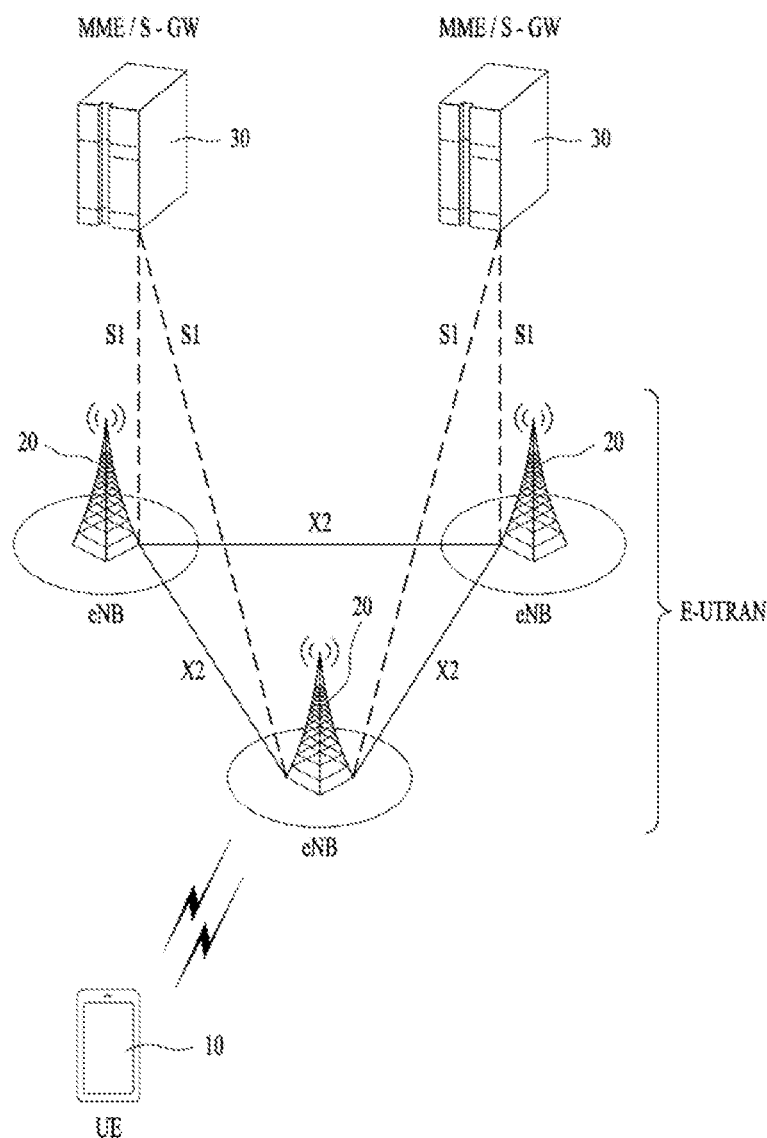
FIG. 2 illustrates the structure of an LTE system.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
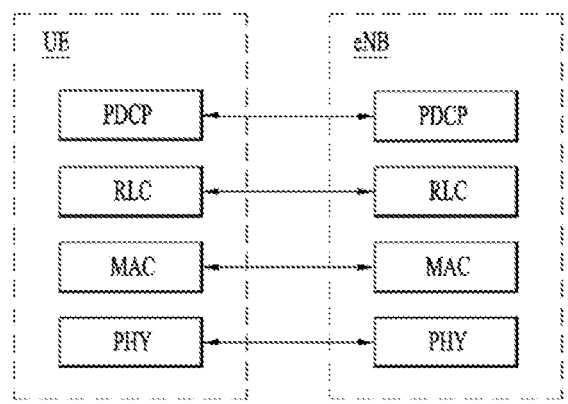
FIG. 3 illustrates a user-plane radio protocol architecture.

FIG. 3 illustrates a user-plane radio protocol architecture.

Figure 4:
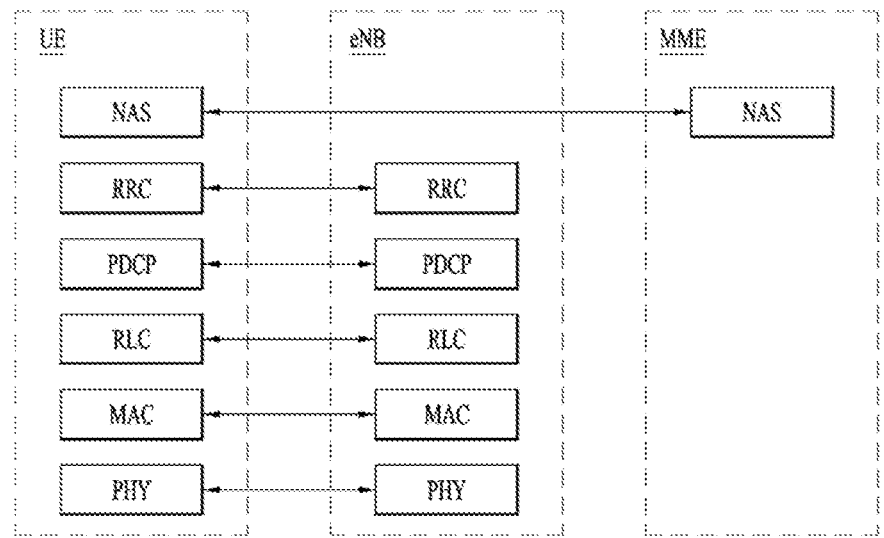
FIG. 4 illustrates a control-plane radio protocol architecture.

FIG. 4 illustrates a control-plane radio protocol architecture. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 5:
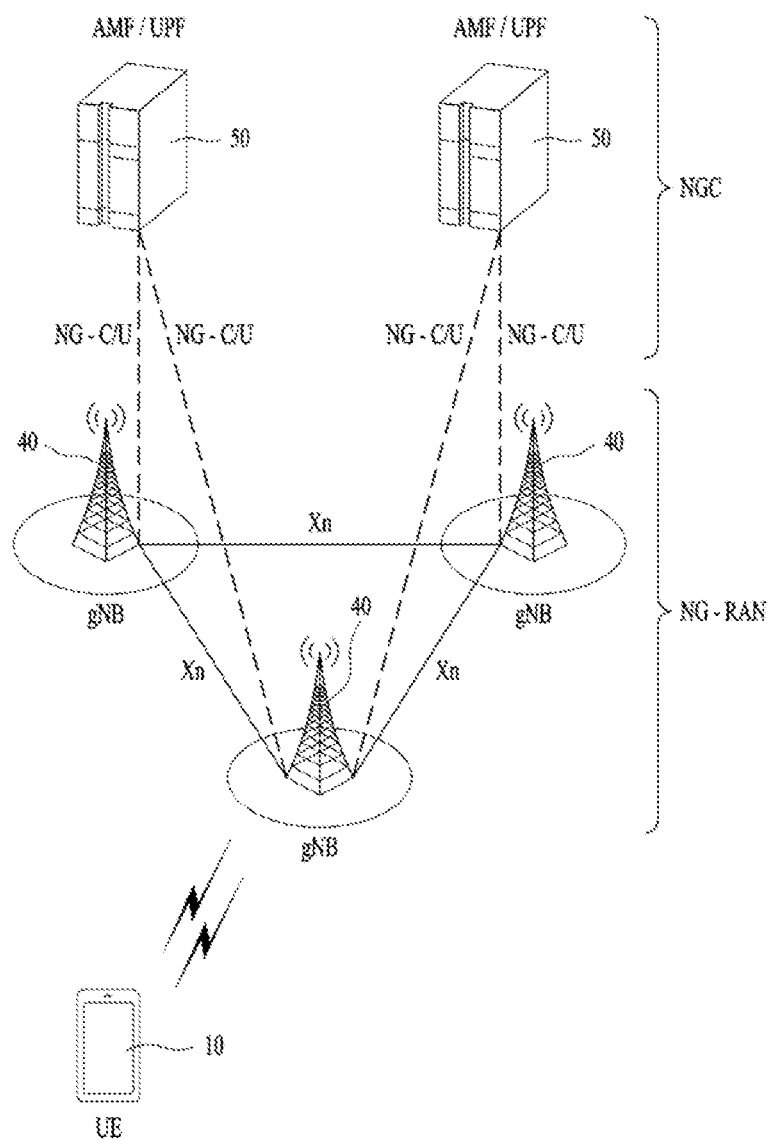
FIG. 5 illustrates the structure of an NR system.

FIG. 5 illustrates the structure of a NR system.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
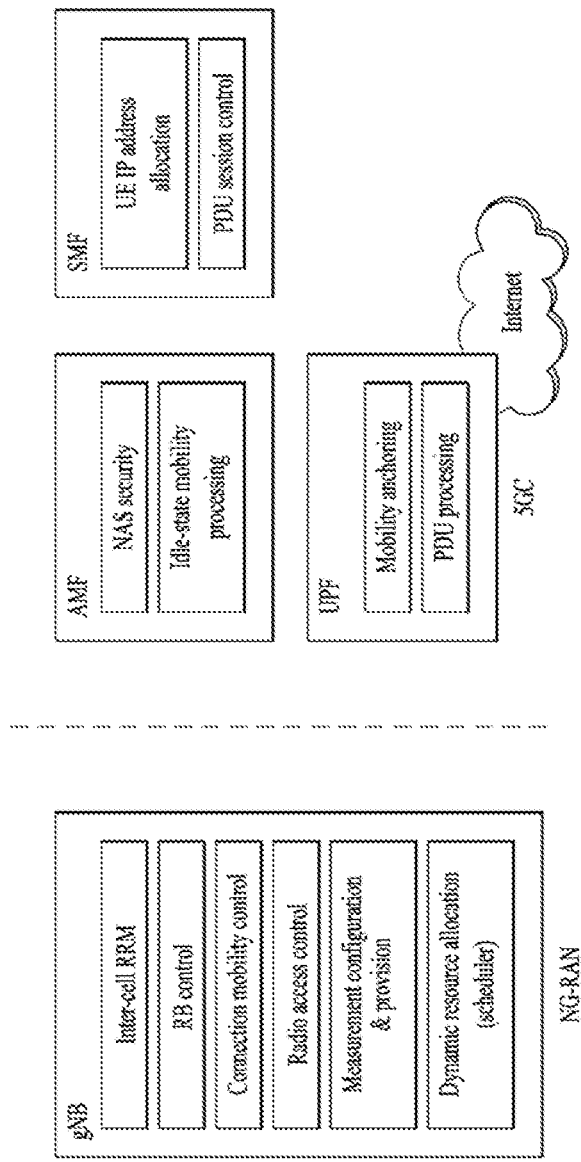
FIG. 6 illustrates functional split between an NG-RAN and a 5GC.

FIG. 6 illustrates functional split between the NG-RAN and the 5GC.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
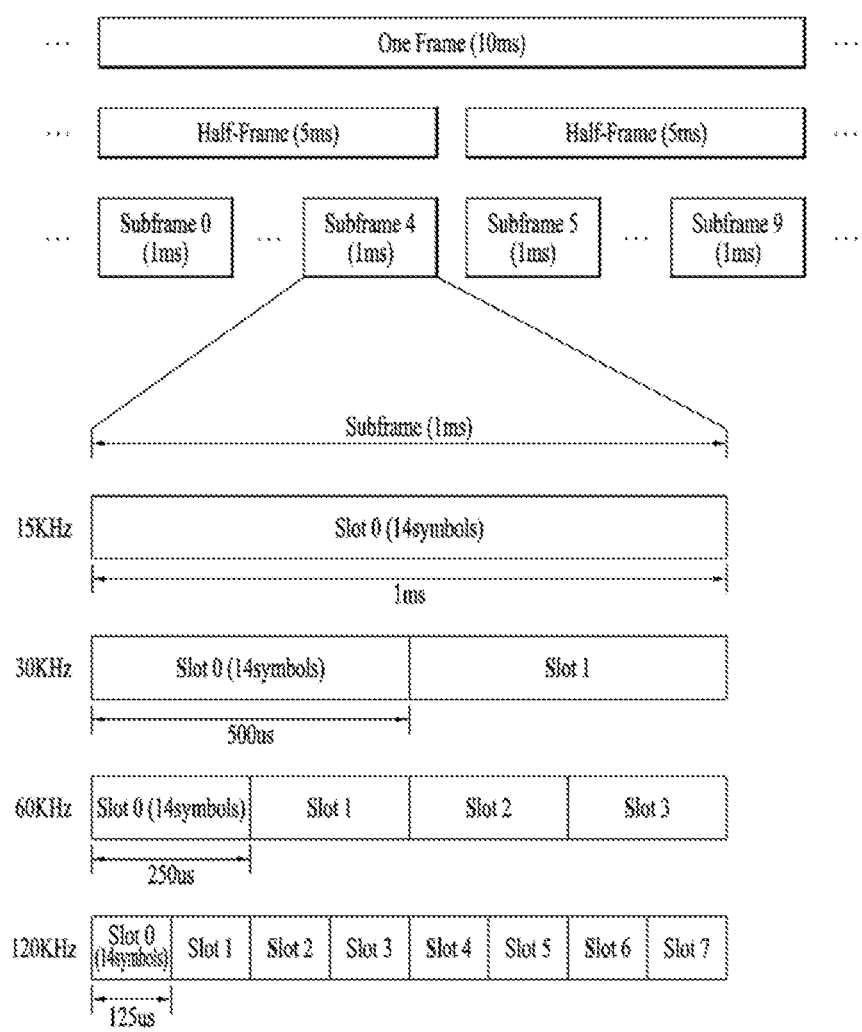
FIG. 7 illustrates the structure of an NR radio frame.

FIG. 7 illustrates the structure of a NR radio frame.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
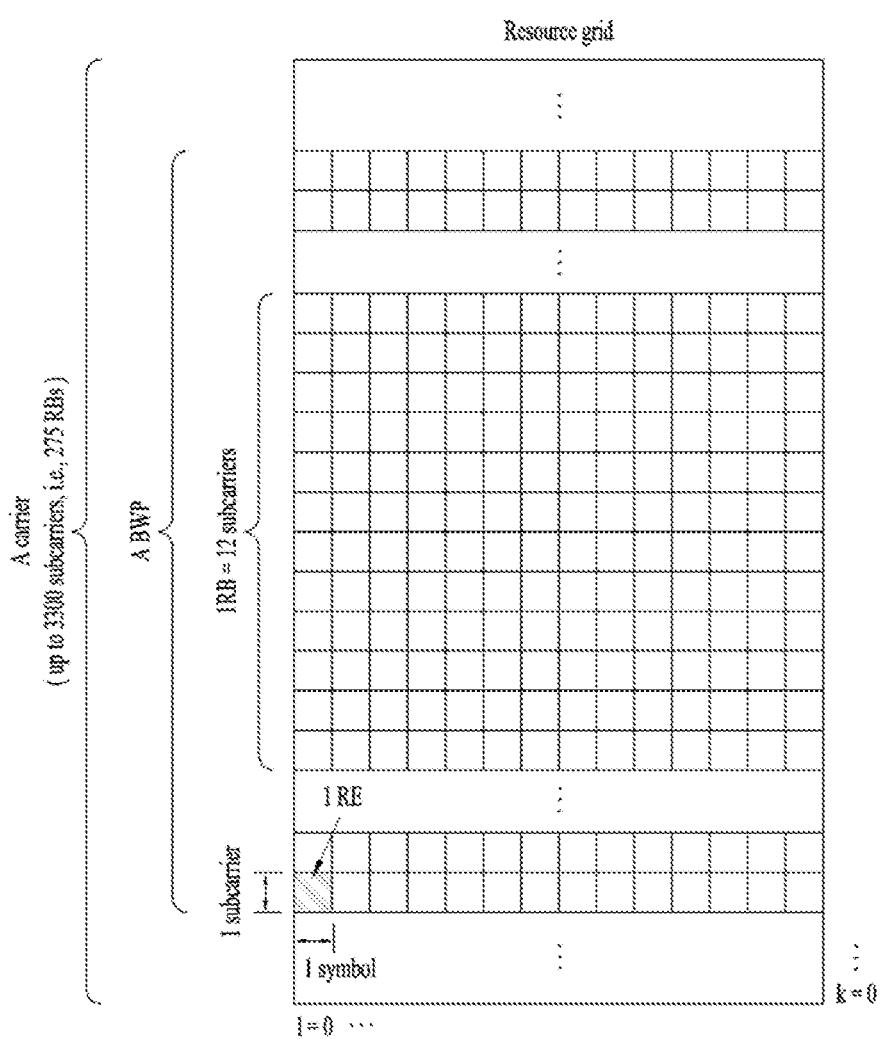
FIG. 8 illustrates the slot structure of an NR frame.

FIG. 8 illustrates the slot structure of a NR frame.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
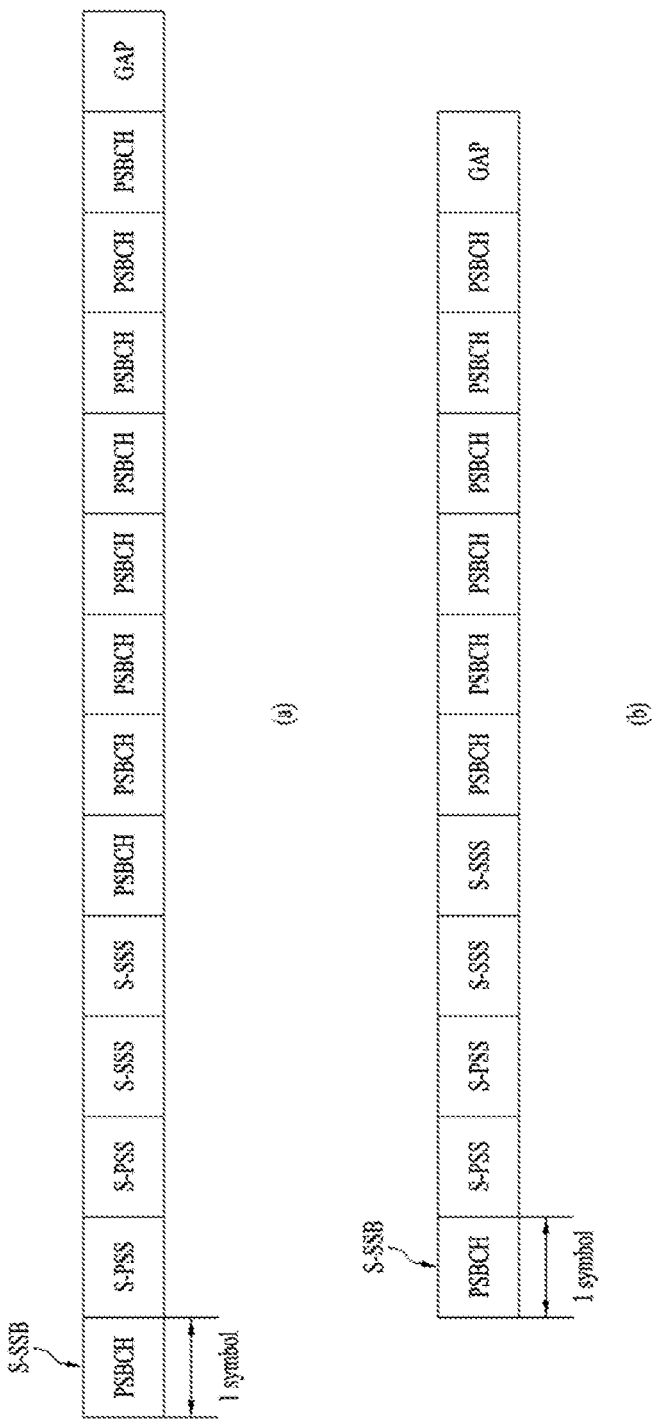
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
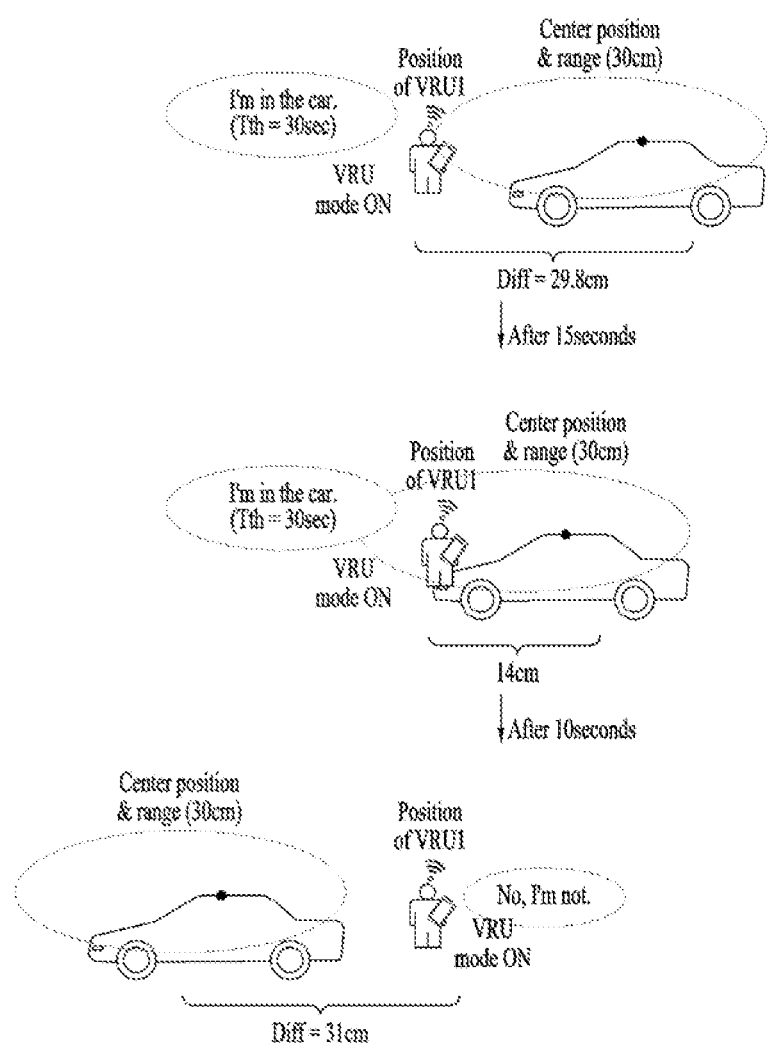
FIG. 20 illustrates conditions for a VRU to stop transmitting a safety message.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 us. For example, in the case of FR2, the transition period may be 5 us. For example, a search window in which the receiving UE is to detect the S-PSS may be 80 ms and/or 160 ms.

Figure 11:
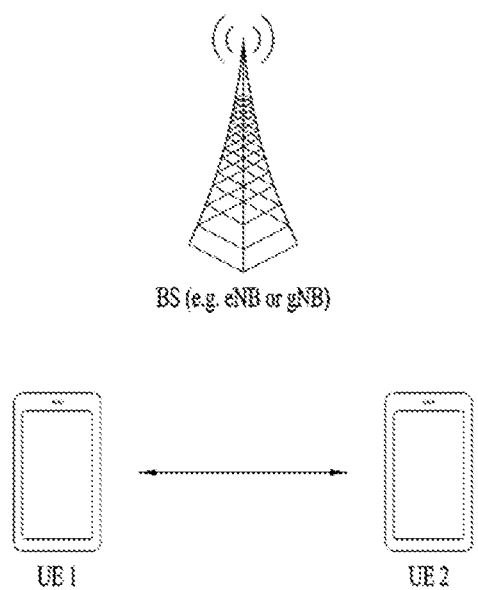
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
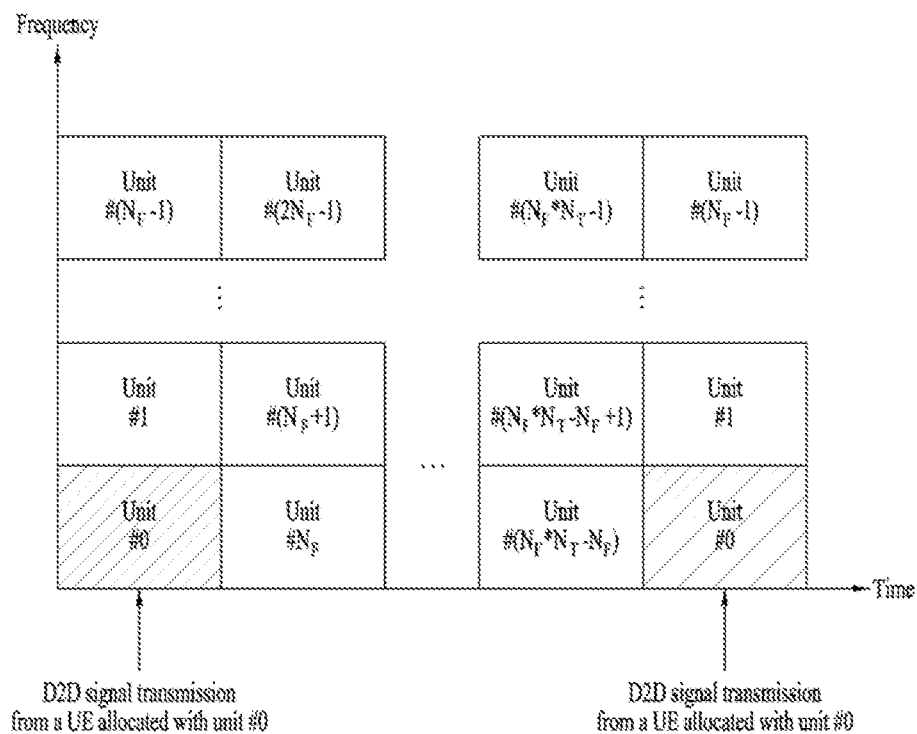
FIG. 12 illustrates resource units for V2X or SL communication.

FIG. 12 illustrates resource units for V2X or SL communication.

Referring to FIG. 12, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 12 shows an exemplary case where the resource pool is repeated with a periodicity of $N_T$ subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 13-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 13-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
  - (transmission traffic/packet related) QoS information; e.g., priority information; and/or
  - SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and 1-DMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
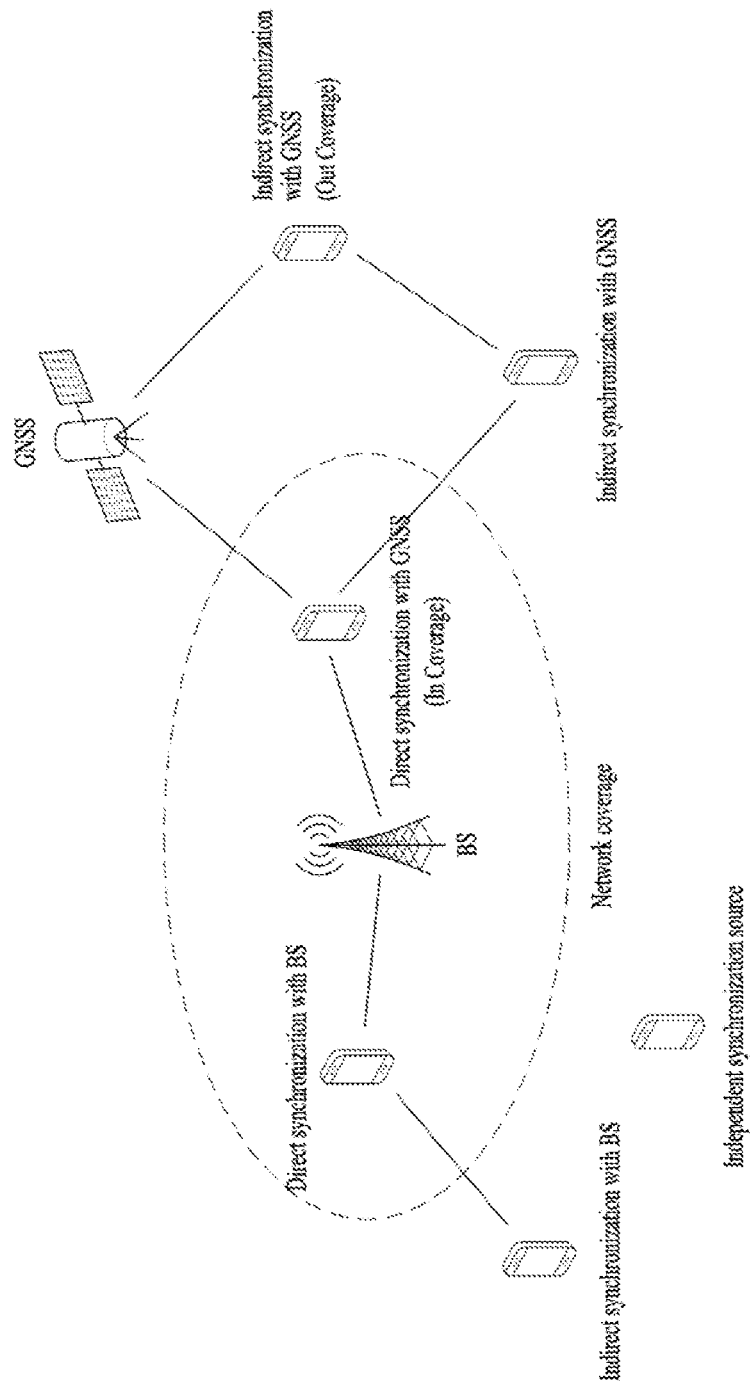
FIG. 14 illustrates a V2X synchronization source or synchronization reference.

FIG. 14 illustrates a V2X synchronization source or reference.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not acquired synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Vehicular Communications for ITS

An intelligent transport system (ITS) designed to utilize Vehicle-to-Everything (V2X) communication may mainly include an Access layer, a Network & Transport layer, a Facilities layer, an Application layer, a Security Management Entity, etc. V2X communication may be applied to various scenarios such as vehicle-to-vehicle (V2V) communication, V2N (or N2V) communication between vehicle and BS (base station), V2I (or I2V) communication between a vehicle and an RSU (Road Side Unit), I2I communication between one RSU and another RSU, a V2P (or P2V) communication between vehicle to person, and I2P (or P2I) communication between RSU and person. In this case, the vehicle, the BS (or eNB), the RSU, the person, etc., each of which serves as a subject of vehicle communication, will hereinafter be referred to as an ITS station.

Figure 15:
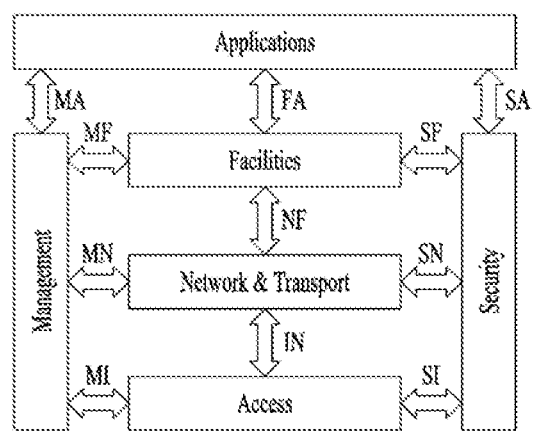
FIG. 15 is a diagram illustrating an ITS station reference architecture.

FIG. 15 is a schematic diagram illustrating an ITS (intelligent transport system) station reference architecture.

Referring to FIG. 15, the ITS station reference architecture may include an access layer, a network & transport layer, a facilities layer, a security management entity, and an application layer that serves as the uppermost layer. Basically, the ITS station may operate to follow a layered OSI (OSI layer) model.

In detail, FIG. 15 is a conceptual diagram illustrating characteristics of the ITS station reference architecture based on the OSI model. Referring to FIG. 15, the access layer of the ITS station may correspond to an OSI Layer 1 (physical layer) and Layer 2 (data link layer), the network & transport layer of the ITS station may correspond to OSI Layer 3 (network layer) and Layer 4 (transport layer), and the facilities layer of the ITS station may correspond to an OSI Layer 5 (session layer), Layer 6 (presentation layer), and Layer 7 (application layer).

The application layer acting as the uppermost layer of the ITS station may actually implement and support a variety of use cases, and may be selectively used according to which one of the use cases is used. A management entity may serve to manage communication and operations of the ITS station as well as all the layers of the ITS station. The security entity may provide security services of all layers of the ITS station. The respective layers of the ITS station may exchange not only transmission (Tx) or reception (Rx) data to be used for V2X communication through an interface therebetween, but also additional information having various purposes with one another. The following description illustrates abbreviations of various interfaces.

MA: Interface between management entity and application layer

MF: Interface between management entity and facilities layer

MN: Interface between management entity and networking & transport layer

MI: Interface between management entity and access layer

FA: Interface between facilities layer and ITS-S applications $N_F$: Interface between networking & transport layer and facilities layer IN: Interface between access layer and networking & transport layer SA: Interface between security entity and ITS-S applications SF: Interface between security entity and facilities layer SN: Interface between security entity and networking & transport layer SI: Interface between security entity and access layer Management of VRU Mode Based on Estimation of Boarding of a Vehicle A VRU boarding a vehicle is under the protection of the vehicle, and thus it may not be necessary to transmit a safety message. Accordingly, when boarding of the vehicle is detected, the VRU may stop transmitting the safety message in order to prevent an increase in congestion of the safety message and minimize unnecessary power consumption. In other words, VRUs outside the vehicle need to transmit/receive safety messages. On the other hand, a VRU in the vehicle is protected by the vehicle and therefore it does to send the safety message any longer.

Thus, hereinafter, a method and device for recognizing or determining, by a VRU, whether it is in a vehicle and its state ("I get into the car now, I am in the car" or "I am getting off the car and am out of the car") and suggest a device.

In order to determine whether the vehicle is boarded, the vehicle may periodically transmit a beacon message (or vehicle beacon) related thereto. The beacon message may include information about the vehicle and mobility information about the vehicle. In this case, the vehicle may adjust the signal strength of the vehicle beacon to allow the VRU to identify whether the vehicle is boarded. Specifically, when the VRU receives a vehicle beacon signal, the VRU may determine that it is in the vehicle. However, there is a possibility that the vehicle beacon signal may be received even when the VRU is outside the vehicle. Accordingly, the vehicle may adjust the signal strength of the vehicle beacon to allow the VRU to receive the signal of the vehicle beacon only when it is inside the vehicle. For example, the beacon may further include information on the strength of a signal for recognizing occupancy of the vehicle, and the VRU may recognize or identify whether it is in the vehicle based on the vehicle beacon. Alternatively, when the vehicle beacon is received with a reception strength greater than or equal to a first reference threshold, the VRU may determine that it is inside the vehicle and estimate that the vehicle is occupied. Here, the first reference threshold may be predetermined based on the average reception strength of the vehicle beacon inside the vehicle and the average reception strength of the vehicle beacon outside the vehicle. Alternatively, information on the first reference threshold may be included in the vehicle beacon.

Figure 16:
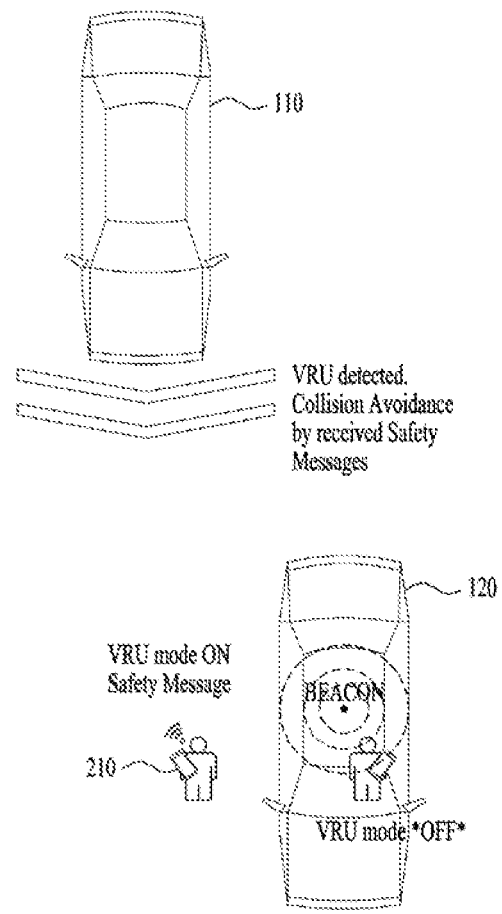
FIG. 16 is a diagram illustrating a method for determining whether a vehicle is boarded by a VRU based on the signal strength of a vehicle beacon.

FIG. 16 is a diagram illustrating a method for determining whether a vehicle is boarded by a VRU based on the signal strength of a vehicle beacon.

If the signal strength of the vehicle beacon is not adjustable, the VRU may receive a signal related to the vehicle beacon even when it is not in the vehicle, and stop transmitting a VRU safety message, determining that it is in the vehicle. In this case, since a vehicle moving in the vicinity does not receive the safety message from the VRU, and is highly likely to collide with the VRU.

Referring to FIG. 16, signal strength may be adjusted to allow the signal of a vehicle beacon to be received only inside the vehicle. In this case, the VRU may receive the vehicle beacon only when it is actually in the vehicle. Once the vehicle beacon is received, stopping transmission of the safety message does not cause a safety problem. In addition, the VRU outside the vehicle continuously transmit the safety message. Then, vehicles moving around may receive the safety message and avoid a collision.

Receiving the vehicle beacon may mean that the vehicle beacon is received with a reception strength greater than or equal to a preset threshold. Alternatively, the vehicle beacon may further include information on the strength of a specific signal that may be identified as a signal received inside the vehicle, and the VRU may determine or recognize that it is in the vehicle when the strength of the received vehicle beacon is greater than or exceeds the strength threshold.

Figure 17:
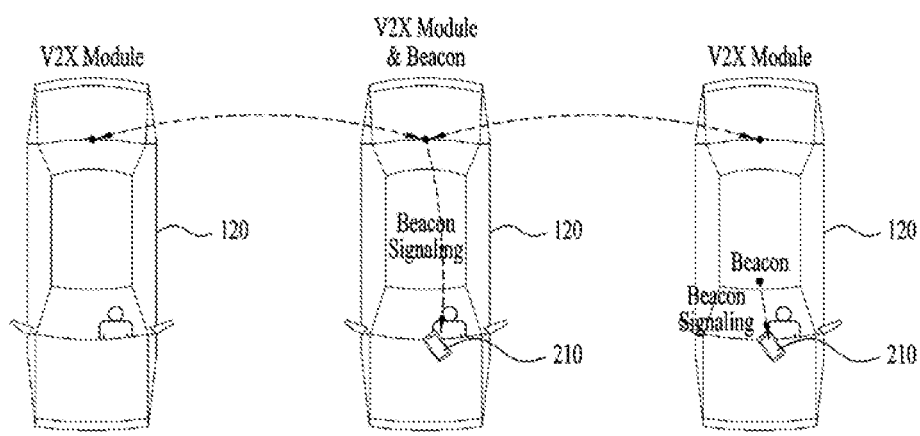
FIG. 17 is a diagram illustrating a communication module for transmitting a vehicle beacon.

Also, as shown in FIG. 17, the above-described vehicle beacon or beacon may be a V2X communication module used for the vehicle to perform V2X communication. For example, the signal of the vehicle beacon may be delivered to the VRU on the PSBCH, the PSSS, the SSSS, the PSDCH, the PSSCH, or the PSCCH. Communication between the vehicle beacon and the VRU may be performed by a technology other than the V2X communication, such as, for example, Wi-Fi, Bluetooth, or Zigbee.

FIG. 18 illustrates information included in a beacon transmitted from a vehicle.

Referring to FIG. 18-(*a*), a vehicle beacon may include a reference point serving as a center and area information related to a reference range from the reference point for determining boarding of the vehicle. Specifically, the vehicle beacon incudes the following information:

Reference position from which the vehicle beacon is transmitted;

Reference range from the reference position (radius of a circle centered at the reference position) indicating an area in which the VRU may determine that the VRU is in the vehicle The vehicle beacon information may include a reference position (or position of the beacon) and reference range information for determining boarding of the vehicle. In this case, the VRU may calculate the distance between the VRU and the reference position information provided by the beacon, and identify or determine whether it is positioned inside the vehicle based on the information on the reference range. For example, the reference position may be a point at which a beacon is transmitted, and the reference range may have a radius R.

Alternatively, the reference position may correspond to a center position of the vehicle. In this case, the reference range may be information about a specific radius from the center position of the vehicle. In this case, the VRU may calculate the distance between the reference position, which is the center position of the vehicle provided by the vehicle beacon, and the VRU, and may recognize or determine that it is in the vehicle when the calculated distance is less than or equal to the specific radius.

Alternatively, the reference position may be a central position in a range within which a user or a passenger may get into the vehicle. In this case, the reference range may be range information indicating the range within which the user may board the vehicle with respect to the reference position. For example, the reference position and the reference range may include information corresponding to a range within which the user or passenger may be positioned inside the vehicle.

Referring to FIG. 18-(*b*), a vehicle beacon may include position information about four vertices of a rectangular area where the vehicle may be boarded. The vehicle beacon signaling may carry information about a reference position and a width and length of the vehicle. The reference position may be a center point of the four vertices that is to be signaled, or a predefined point among the four vertices (e.g., a vertex closest to the driver's seat). Alternatively, information on the angle and distance of each vertex with resepc to the center of the rectangular area and information about the center may be included in the vehicle beacon. For example, when the rectangle is not a square, the vehicle beacon may include only information on one angle (90 degrees) and one distance and information about the center. Alternatively, when the rectangle is not a square, the vehicle beacon may include information on two angles and two distances and information on the center. Alternatively, the vehicle beacon may include position information about the four vertices of the rectangle.

Specifically, the vehicle beacon may include information related to a corresponding vehicle. The VRU may determine or detect whether the VRU is getting into the vehicle or is in the vehicle, based on the vehicle beacon. Alternatively, the vehicle beacon may include at least one of the pieces of information defined in Table 7 below.

TABLE 7

| Name | Data type | Description |
|---|---|---|
| Beacon Id | integer | Unique id given to each beacon |
| position | | A position that serves as a reference for the position of the vehicle<br>type (integer): default (0), position of beacon transmission (1), position of the vehicle center (2), position of the center of an area for getting into the vehicle (3), position of a designated one of the four vertices of the area for getting into the vehicle (4) (e.g., the vertex closest to the driver's seat)<br>latitude (the latitude of the reference point), longitude (the longitude of the reference point), altitude (the altitude of the reference point), positionConfidenceEllipse (the confidence of the value indicating the reference point) |
| radius | integer | Radius indicating a specific area or range from the reference point |
| widthOfOnBoardArea | integer | Width of the vehicle boarding area |
| lengthOfOnBoardArea | integer | Length of the vehicle boarding area |
| fourEndPoints | | Indicates the position of the four end vertices of the vehicle boarding area, a relative position with respect to the center point or an absolute position.<br>leftFront (the position of the left front vertex among the four vertices), rightFront (the position of the right front vertex among the four vertices), leftRear (the position of the left rear vertex among the four vertices), rightRear (the position of the right rear vertex among the four vertices) |

The above vehicle beacon signaling structure may be represented in ASN.1 format as follows.

```
Beacon signaling ::= SEQUENCE {
Beacon Id INTEGER (1...2^64),
position (type INTEGER (1... xx),
    latitude Latitude,
    longitude Longitude,
    altitude Altitude,
    positionConfidenceEllipse PosConfidenceEllipse),
radius INTEGER (1...xx),
widthOfOnBoardArea INTEGER (1...width of the vehicle),
lengthOfOnBoardArea INTEGER (1...length of the vehicle),
fourEndPoints (leftFront, rightFront, leftRear, rightRear)
}
```

Figure 19:
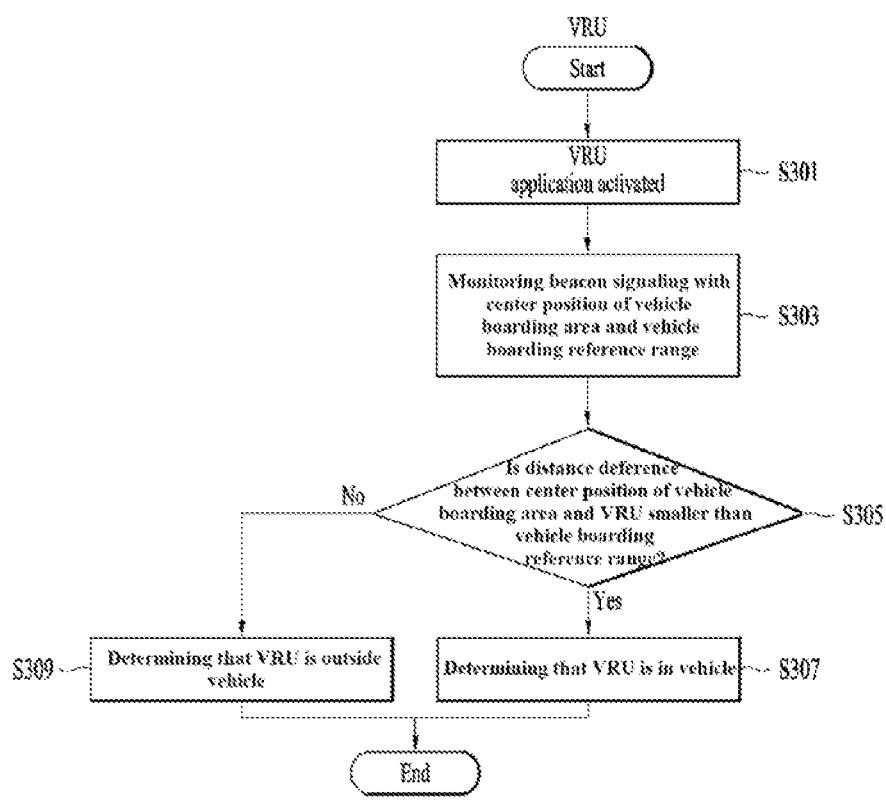
FIG. 19 is a diagram illustrating a method for recognizing whether a vehicle is boarded by a VRU based on beacon information.

FIG. 19 is a diagram illustrating a method for recognizing whether a vehicle is boarded by a VRU based on information about a vehicle beacon.

Referring to FIG. 19, the VRU may activate an application related to a safety message (S301). In this case, the VRU may transmit a sidelink signal or a safety message including information about the position thereof.

Next, the VRU may monitor whether a vehicle beacon, which is a basis for determining whether the vehicle is boarded, is received (S303). The vehicle beacon may include information on a center position of an area where the vehicle may be boarded (or the center position of a vehicle or a transmission position of the vehicle beacon) and information on a reference range. Alternatively, the VRU may specify a specific area based on the center position and the reference range.

The VRU may determine whether a distance between the reference position included in the received vehicle beacon and the position of the VRU is less than or equal to the reference range (S305). Alternatively, the VRU may specify a predetermined area based on the reference position and the reference range, and may determine whether position information on the VRU belongs to the specified area, which is the predetermined area. The VRU may measure or acquire information on the position thereof based on the time when the vehicle beacon is received or recently using a GPS or the like.

When the distance between the reference position and the measured position is within the reference range or the measured position belongs to the specific area, the VRU may estimate that it is in the vehicle (S307).

Alternatively, when the distance between the reference position and the measured position is out of the reference range or the measured position does not belong to the specific area, the VRU may estimate that it is not in the vehicle (S309).

In this way, the VRU may estimate whether the VRU or the VRU user is in the vehicle based on the position information thereabout and the vehicle beacon signal, and determine whether to stop transmitting the safety message based on the result of estimation of whether the VRU or the VRU user is in the vehicle.

However, when the VRU or the user of the VRU is at a position adjacent to the stopped vehicle, the VRU or the user of the VRU may erroneously estimate boarding of the vehicle based on the vehicle beacon even if the user is not in the vehicle. Therefore, the VRU needs to determine whether to stop transmitting the safety message by additionally considering separate conditions even when it is estimated that the vehicle is boarded according to the vehicle beacon.

Specifically, when the VRU is not actually in the vehicle, the VRU may misrecognize that it is positioned within the reference range included in the vehicle beacon or within the specific area. If the VRU stops transmitting the safety message due to such misrecognition, the safety of the VRU or the user of the VRU may not be properly ensured. For example, when the VRU is close to a stopped vehicle within the reference range or moves while maintaining a predetermined distance from the vehicle within the reference range (or the information on the vehicle beacon includes information about a wrong reference range), the VRU may erroneously estimate or determine that it is in the vehicle although it is not in the vehicle. In this case, the VRU may stop transmitting the safety message due to the erroneous estimation of vehicle boarding, and the safety of the user of the VRU may not be ensured.

Accordingly, even when the boarding of the vehicle is estimated based on the vehicle beacon, the VRU may not immediately stop transmitting the safety message, but may stop the transmission of the safety message when an additional condition is satisfied.

Specifically, the VRU may determine whether to stop transmitting the safety message, additionally considering whether the estimated boarding of the vehicle is maintained for a preset time or whether the boarding of the vehicle is estimated for a predetermined number of times within a preset time.

In addition, the sameness of the vehicle beacons on which the estimation of boarding of the vehicle is based may be required. For example, the VRU may periodically receive multiple vehicle beacons and determine whether boarding of the vehicle is estimated a predetermined number of times based on the multiple received vehicle beacons. Here, the multiple vehicle beacons may be vehicle beacons having the same beacon ID. That is, the number of times the vehicle boarding is estimated may be determined based on the number of times the vehicle beacons including the same beacon ID are received.

Alternatively, the VRU may determine whether boarding of the vehicle is estimated a predetermined number of times based on multiple vehicle beacons including the same beacon ID from a moving vehicle. In other words, when a vehicle related to a beacon ID moves while a vehicle beacon including the same beacon ID is periodically received, the VRU may determine whether the boarding of the vehicle is estimated for the predetermined number of times based on the periodically received vehicle beacons.

As shown in FIG. 20, the VRU may be moving in an area adjacent to a road without boarding the vehicle. In this case, the VRU may receive a vehicle beacon from a vehicle traveling on the road, and may estimate whether the vehicle is boarded based on the received vehicle beacon.

Specifically, referring to FIG. 20-(*a*), the VRU may receive a vehicle beacon from a vehicle traveling on the road. The VRU may acquire information about a center position and a reference range (30 cm) from the vehicle beacon. In this case, when the distance between the position of the VRU and the center position is 29.8 cm, the VRU may estimate that the VRU is in the vehicle based on the vehicle beacon. In this case, the VRU may determine whether presence in the vehicle is continuously estimated for 30 seconds, which is a preset time.

Next, referring to FIG. 20-(*b*), the VRU may still estimate the VRU is in the vehicle based on the vehicle beacon received after a certain time elapses (15 seconds). However, since the predetermined time has not elapsed yet, the VRU may continuously transmit a safety message in the VRU mode ON state.

Referring to FIG. 20-(*c*)), the VRU may receive the vehicle beacon from the vehicle again after a predetermined time (10 seconds) elapses. The VRU may calculate a distance (31 cm) between the included reference position and the measured position based on the received vehicle beacon, and may confirm that the distance is out of the reference range (30 cm). In this case, the VRU may finally determine that it is not in the vehicle, and may continuously transmit the safety message by maintaining the VRU mode ON state.

In other words, the VRU may determine whether to turn off the VRU mode based on whether boarding of the vehicle based on the vehicle beacon is recognized for 30 seconds. When the boarding of the vehicle is recognized by the received vehicle beacon, the VRU may continuously monitor boarding of the vehicle based on the vehicle beacon for additional 30 seconds. Referring to FIG. 20, since the VRU is not within the reference range included in the vehicle beacon after 25 seconds, it may continuously transmit the safety message without turning off the VRU mode.

In this way, by determining whether the estimation of the boarding of the vehicle is maintained for a preset time, the present disclosure may prevent the VRU from erroneously determining that the vehicle is boarded when the VRU temporarily approaches the vehicle, thereby preventing the transmission of the safety message from being interrupted.

Figure 21:
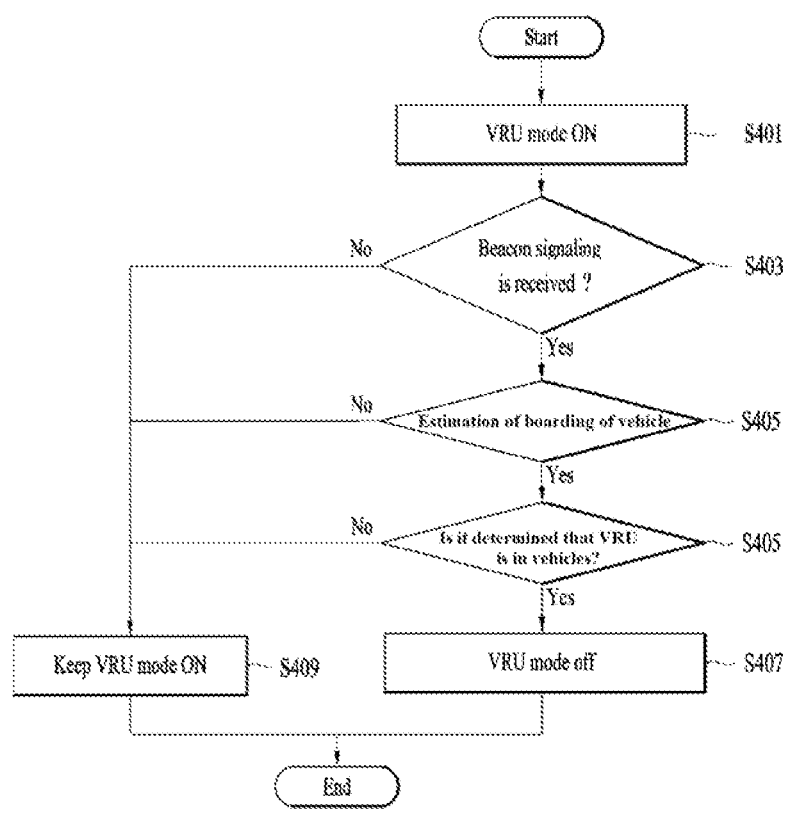
FIG. 21 is a flowchart illustrating a method for determining, by a VRU, whether to stop transmitting a safety message.

FIG. 21 is a flowchart illustrating a method for determining, by a VRU, whether to stop transmitting a safety message.

Referring to FIG. 21, the VRU may activate a VRU mode related to transmission of a safety message (S401). The VRU may send the safety message when the VRU mode is activated. The VRU may continuously monitor whether a vehicle beacon transmitted from the vehicle is received in order to determine whether to switch the VRU mode to the off state (S403). When the vehicle beacon is received, the VRU may estimate whether the vehicle is boarded. For example, as described above, the VRU may estimate whether it is positioned in the vehicle based on the reference position and the reference range included in the received vehicle beacon.

Next, when it is estimated that the VRU is positioned in the vehicle based on the reference position and the reference range included in the vehicle beacon, it may be determined whether it is necessary to switch the VRU mode to the off state based on whether the above-described additional condition (or preset condition) is satisfied (S405). Here, the preset condition may include whether the estimation of boarding of the vehicle is maintained for a preset time, whether boarding of the vehicle is estimated for a predetermined number of times, whether the same beacon ID is included in repeatedly received vehicle beacons, and/or whether movement of the vehicle is detected based on the vehicle beacon.

Specifically, the VRU may periodically receive the vehicle beacon for a preset time when boarding of the vehicle is estimated by the vehicle beacon. The VRU may stop transmitting the safety message when the boarding of the vehicle is persistently estimated from the periodically received vehicle beacons.

Alternatively, the VRU may stop transmitting the safety message when boarding of the vehicle is estimated from the periodically received vehicle beacons a preset number of times. Here, the preset number of times the vehicle boarding is estimated may correspond to the number of times a vehicle beacon including a reference range and a reference position from which boarding of the vehicle may be estimated is received. Alternatively, the preset number of times boarding of the vehicle is estimated may correspond to the number of times vehicle beacons including the same beacon ID and including a reference range and a reference position from which the boarding of the vehicle may be estimated are received. Alternatively, the preset number of times the boarding of the vehicle is estimated may correspond to the number of times vehicle beacons including the same beacon ID are received after movement of the vehicle is detected based on the vehicle beacon. Alternatively, the VRU may stop transmitting the safety message when the boarding of the vehicle is estimated for a predetermined number of times during a preset time.

When the boarding of the vehicle is estimated and the additional conditions as described above are satisfied, the VRU may switch the VRU mode to the off stae to stop transmitting the safety message (S407).

As such, according to the proposed embodiments of the present disclosure, the unnecessary transmission of the safety message may be minimized by turning off the VRU mode of the VRUs present in the vehicle, thereby reducing the power consumption of the VRU while minimizing the load and congestion of the network.

Figure 22:
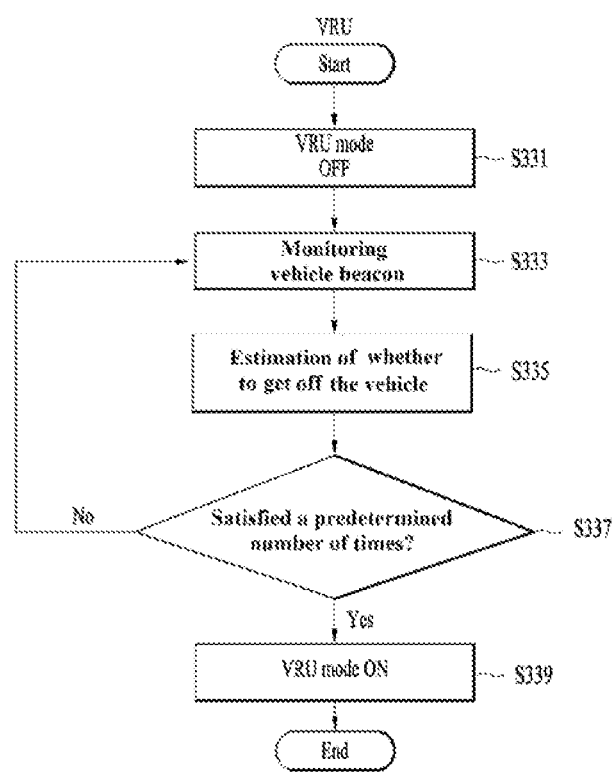
FIG. 22 is a diagram illustrating a method for resuming transmission of a safety message interrupted by a VRU boarding a vehicle.

FIG. 22 is a diagram illustrating a method for resuming transmission of a safety message interrupted by a VRU boarding a vehicle.

Referring to FIG. 22, the VRU may stop transmitting the safety message (or turn off the VRU mode) when it is determined that the VRU is in the vehicle (S331). After the VRU mode is off, the VRU may continuously monitor a vehicle beacon (S333). That is, even after stopping the transmission of the safety message according to the boarding of the vehicle, the VRU may continuously monitor the periodically transmitted vehicle beacon in order to determine whether the boarding of the vehicle is estimated.

The VRU may estimate whether the VRU is still in the vehicle (or whether the VRU has gotten off the vehicle) based on the received vehicle beacon (S335). Specifically, when the VRU is not positioned in a specific area specified based on the received vehicle beacon, it may estimate that the VRU has gotten off the vehicle. When the vehicle beacon is not received for a preset time period, the VRU may immediately switch the VRU mode to the on state and resume transmission of the safety message.

Next, the VRU may determine whether an additional condition is satisfied when getting off the vehicle is estimated (S337). Specifically, as described above, the VRU may determine whether at least one condition of a condition that the same beacon ID is included a predetermined number of times during a preset time and a condition that movement of the vehicle is detected is additionally satisfied as described above.

When getting off the vehicle is estimated and the above-described additional condition is satisfied, the VRU may change the VRU mode to an ON state and resume transmission of the safety message (S339). For example, when the estimation of the state of getting off the vehicle is maintained for a preset time or when the state of getting off the vehicle is estimated a predetermined number of times the VRU may switch the VRU mode to the ON state and resume the transmission of the safety message.

Alternatively, the VRU may immediately turn on the VRU mode to resume transmission of the safety message when getting off the vehicle is estimated based on the vehicle beacon. That is, the estimation of getting off the vehicle does not require estimation of getting off the vehicle a predetermined number of times (i.e., it is not related to the number of times of or time for estimation), and the VRU may set the VRU mode ON and transmit a safety message upon estimating getting off the vehicle based on the vehicle beacon. In this case, the VRU may ensure its own safety because it can transmit the safety message immediately upon estimating getting off the vehicle.

Alternatively, the VRU may additionally consider whether the estimation of getting off vehicle based on the vehicle beacon is results from an error. When it is determined that the estimation of getting off results from the error, the VRU may put off switching the VRU mode to the ON state. For example, the estimation of getting off may result from an error in position information included in the vehicle beacon or an error in position measurement of the VRU. That is, completely incorrect position information may be measured due to an error in, for example, GPS, or information on an incorrect reference position may be included the vehicle beacon. In this case, the VRU does not switch the VRU mode to the ON state, considering that an error has occurred either in the measured position thereof or in the reference position included in the vehicle beacon.

Specifically, when it is estimated that the vehicle has gotten off the vehicle based on the received vehicle beacon, the VRU may additionally determine whether there is an error in the vehicle beacon or in the measurement of the position of the VRU. When a difference between the reference position acquired from the vehicle beacon and the reference position acquired from the previously received vehicle beacon is greater than or equal to a specific threshold, the VRU determines that the reference position included in the recently received vehicle beacon has an error, and thus does not resume transmission of the safety message even if getting off the vehicle is estimated based on the vehicle beacon. Alternatively, when the difference between the currently measured position of the VRU and the previously measured position of the VRU is greater than or equal to the specific threshold, the VRU may determine that an error has occurred in the measurement of the current position of the VRU.

Alternatively, when getting off the vehicle is estimated based on the vehicle beacon, the VRU does not resume transmission of the safety message when the reception strength of the vehicle beacon is greater than or equal to a specific strength threshold. For example, the VRU may determine the specific strength threshold based on an average of reception strengths of beacon signals received after boarding of the vehicle is estimated.

Figure 23:
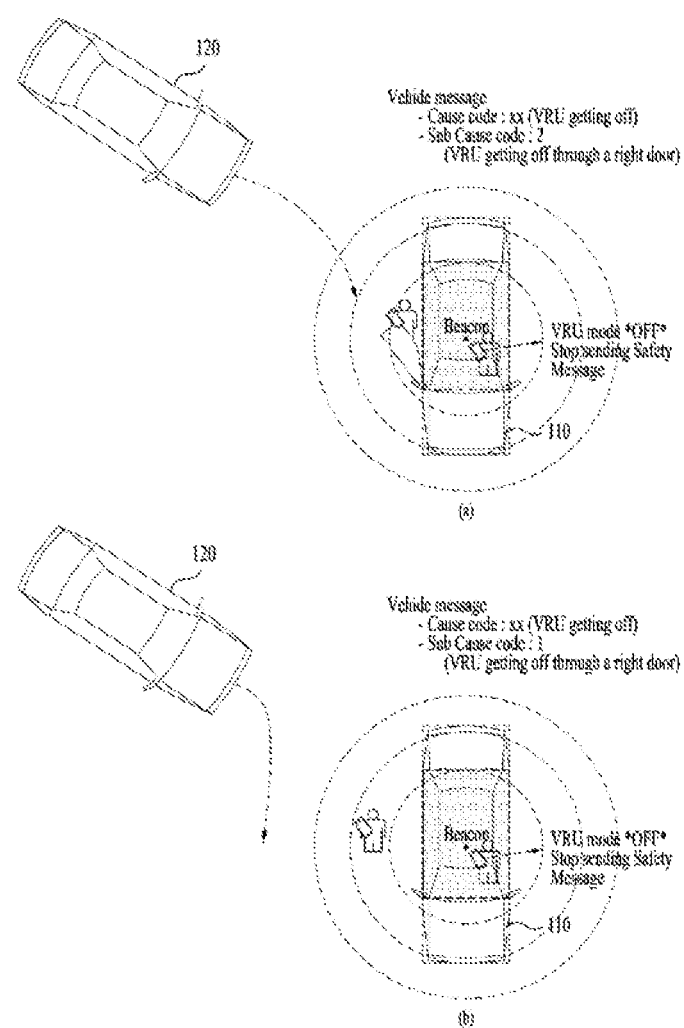
FIG. 23 is a diagram illustrating a method for signaling, by a vehicle, information related to getting off the vehicle by a user of a VRU.

FIG. 23 is a diagram illustrating a method for signaling, by a vehicle, information related to getting off the vehicle by a user of a VRU.

When a user of the VRU, such as a passenger, gets off the vehicle, the vehicle may signal information indicating the action to nearby vehicles. A code indicating that the VRU is currently getting off the vehicle may be added to a message transmitted from the vehicle. The code included in the message may include a cause code and a sub cause code as defined in Table 8.

TABLE 8

| Cause code description | Direct cause code | Sub cause code | Sub cause description |
|---|---|---|---|
| VRU getting off | xx | 0 | Unavailable |
| | | 1 | VRU getting off through a left door(s) |
| | | 2 | VRU getting off through a right door(s) |
| | | 3 | VRU getting off through a rear door(s) |

The information included in the message may be transmitted together with the position information about the vehicle. In addition, when getting off of the VRUs is completed, the vehicle may transmit a cancellation message for the message related to getting off to inform that the event related to getting off has ended. As shown in Table 9, the vehicle may include the cause code whose value is xx in the message to inform that the VRU is getting off the vehicle, and may include a sub cause code in the message to inform an approximate position where the VRU gets off. For example, when the sub cause code is signaled as 1, it may indicate that the VRU is getting off the vehicle at the left side. When the sub case code is 2, it may indicate that the VRU is getting off the vehicle the right side. At this time, other vehicles receiving the message may recognize that the user of the VRU is getting off at the corresponding position based on the cause code of the message and the position information about the vehicle, and may acquire information on the side and position at which the user of the VRU is getting off based on the value of the sub case code and the position information about the vehicle.

Referring to FIG. 23, the VRU mode of the VRU present in the vehicle is OFF, the vehicle is transmitting general V2X messages such as CAM and DENM, and another vehicle is moving next to the vehicle. Then, the moment the VRU gets off the vehicle, the vehicle detects the VRU getting off (through detection of opening of the vehicle door) and transmits the V2X message additionally including the above-described cause code and sub cause code. For example, in the V2X message, which is the vehicle message, 2 may be set as a sub cause code to indicate that the user of the VRU is getting off the vehicle on the right side. The other vehicle receiving the V2X message of the vehicle may determine a position where the VRU user is getting off, based on the position information about the vehicle, the cause code, and the sub cause code included in the V2X message, and may change the direction of movement to a path through which the other vehicle may avoid the determined getting-off position.

Figure 24:
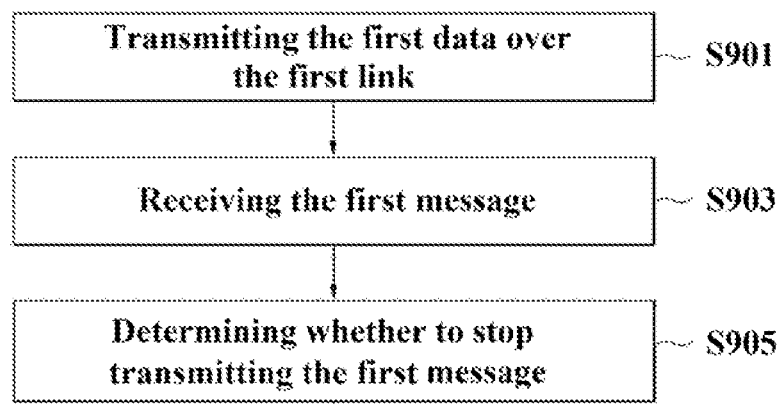
FIG. 24 is a flowchart illustrating a method for stopping transmission of a safety message by a VRU or UE based on a vehicle beacon.

FIG. 24 is a flowchart illustrating a method for stopping transmission of a safety message by a VRU or UE based on a vehicle beacon.

The UE or VRU (hereinafter referred to as UE) may periodically transmit a first message, which is a safety message, in the VRU mode that is in the ON state (S901). Here, the UE may measure position information thereon and transmit the first message including the measured position information. In addition, the UE may periodically transmit the first message, and may monitor whether a second message, which is a vehicle beacon, is received in order to determine whether to stop transmitting the first message. Here, the second message may be configured to estimate or detect whether the UE is in the vehicle.

The UE may receive the second message transmitted from the vehicle when it is positioned near the vehicle or in the vehicle (S903). The second message may include information on a reference range and a reference position, which are information necessary for the UE to determine whether it boards the vehicle. The reference range and reference position included in the second message may be used for the UE to determine a specific area corresponding to a vehicle boarding area. Here, the reference range and the reference position may be predetermined based on the size (length, full width) of the vehicle transmitting the second message or the size of an area in which a passenger or a user of the UE may board the vehicle.

Alternatively, when the second message is received with a characteristic greater than or equal to a first reference threshold, the UE may estimate whether the vehicle is boarded based on the second message. In other words, even when the UE receives the second message, the UE does not determine boarding of the vehicle based on the second message if the reception strength with which when the second message is received is not greater than or equal to the first reference threshold. Here, the first reference threshold may be predetermined based on the reception strength of the second message received when the UE is positioned inside the vehicle and the reception strength of the second message received when the UE is outside the vehicle. In addition, the information on the first reference threshold may be preset by the vehicle and included in the second message. That is, the UE may primarily determine boarding of the vehicle based on only the reception strength of the second message.

When the second message is received with a strength greater than or equal to the first reference threshold, and the second message includes information on a specific area (reference range, reference position, etc.) related to the vehicle boarding area, the UE may determine whether to transmit the first message based on the second message (S905). Hereinafter, for simplicity, it is assumed that the UE has received the second message with a reception strength greater than or equal to the first reference threshold.

Specifically, when the second message includes information on the reference range and the reference position, the UE may determine or detect whether it is in the vehicle having transmitted the second message, based on the reference range and the reference position. The UE may determine whether it is in the vehicle by comparing a measured position thereof with the reference range and the reference position. For example, when the distance between the position of the UE and the reference position is within the reference range, the UE may estimate that the UE is in the vehicle. Alternatively, the UE may determine or specify a specific area related to vehicle boarding based on the reference position and the reference range. When the position of the UE belongs to the specific area (namely, the UE is positioned within the specific area), the UE may estimate that the UE is in the vehicle.

The UE may additionally consider whether the above-described preset condition is satisfied when the boarding of the vehicle is estimated. Specifically, the UE may receive the second message periodically, and determine whether the preset condition is satisfied based on the periodically received second messages. For example, the UE may determine whether the estimation of boarding of the vehicle is maintained for a preset time based on the second messages, whether the boarding of the vehicle is estimated a predetermined number of times based on the second messages, and whether the second messages include the same beacon ID and the movement of the vehicle is detected.

When the boarding of the vehicle is maintained for a preset time based on the second messages or the boarding of the vehicle is estimated the predetermined number of times based on the second messages, the UE may stop transmitting the first message. Alternatively, when the movement of the vehicle is detected based on the second messages and the messages include the same beacon ID, the UE may stop transmitting the first message. Alternatively, when the UE detects the movement of the vehicle based on the second messages, the third messages include the same beacon ID, and the boarding of the vehicle is estimated the preset number of times, the UE may stop transmitting the first message. Alternatively, when the UE detects the movement of the vehicle based on the second messages, the third messages include the same beacon ID, and the boarding of the vehicle is maintained for the preset time, the UE may stop transmitting the first message.

Next, the UE may persistently monitor the second message even after stopping the transmission of the first message. Here, a second message that the UE monitors after stopping transmission of the first message based on the second message is defined as a third message.

When the boarding of the vehicle is not estimated based on the third message, the UE may determine that it has gotten off the vehicle, and resume transmission of the first message. That is, when the UE is not positioned in a specific area identified based on the third message, the UE may determine that it has gotten off the vehicle. Alternatively, when the third message is not received for a preset threshold time, the UE may determine that it has gotten off the vehicle.

Alternatively, the UE may estimate whether the UE has gotten off the vehicle, additionally considering a reference position included in each of the sequentially received third messages. For example, when a difference between a first reference position included in the third message received for the n-th time and a second reference position included in the third message received for the (n−1)-th time is greater than or equal to a preset distance threshold, the UE may not resume the transmission of the first message even when getting off the vehicle is estimated based on the first reference position included in the third message received for the n-th time. That is, when the difference between the first reference position and the second reference position is large, it may be considered that an error has occurred in the measurement of the first reference position in the vehicle. Accordingly, the UE may determine that the estimation of getting off based on the preset distance threshold.

Alternatively, the UE may additionally consider whether a difference between the results of measurement of the position thereof is greater than or equal to a preset distance threshold based on the sequential reception of the third messages. For example, in the UE, when a difference between a first position thereof measured in response to the third message received for the n-th time and a second position thereof measured in response to the third message received for the (n−1)-th time is greater than or equal to a preset distance threshold, it may consider that the measure value of the first position thereof has an error, and thus does not resume transmission of the first message even when the getting-off is estimated based on the first position thereof.

Alternatively, when it is estimated that the UE has not boarded the vehicle based on the third message, but the third message is received with a strength greater than or equal to a second reference threshold, the UE may not resume transmission of the first message. Here, the second reference threshold is set to a value greater than the first reference threshold, and may be preset to a strength by which it may be clearly estimated that the UE is present inside the vehicle.

That is, when the difference between the previously acquired reference range or position of the UE and the currently acquired reference range or position thereof is greater than or equal to the preset distance threshold, the UE may determine that there is an error in the currently acquired reference distance or position of the UE.

As described above, the first message may be a personal safety message (PSM), which is a safety message indicating presence of the UE or the VRU, and the second message may be a vehicle beacon periodically transmitted from the vehicle and defined separately to determine whether the vehicle is boarded. Also, the second message or vehicle beacon may be included in at least one of a cooperative awareness message (CAM), a decentralized environmental notification message (DENM), and a threat notification message (TNM).

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 25:
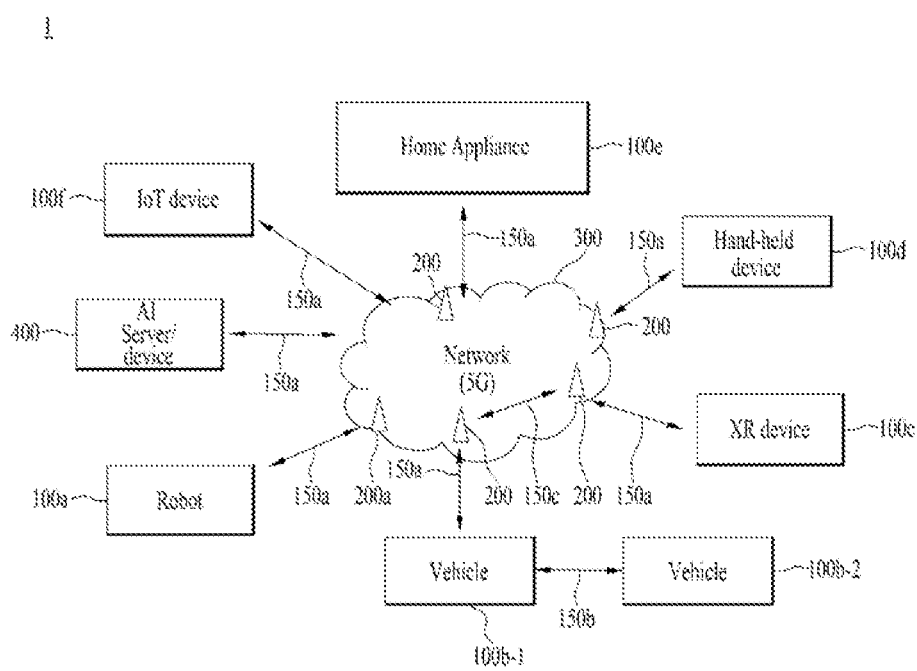
FIG. 25 illustrates a communication system applied to the present disclosure.

FIG. 25 illustrates a communication system applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 26:
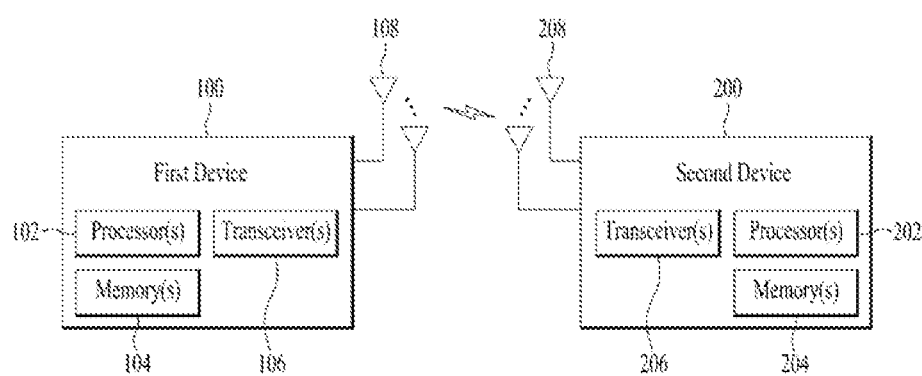
FIG. 26 illustrates wireless devices applicable to the present disclosure.

FIG. 26 illustrates a wireless device applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a memory 104 and a processor 102 coupled to the RF transceiver. The memory 104 may include at least one program capable of performing operations related to the embodiments described with reference to FIGS. 15 to 23.

The processor 102 perform operations including measuring position information related to the UE, transmitting a first message, receiving a second message, and determining whether to stop transmitting the first message based on the position information and the second message. When information on a specific area is included in the second message received with a reception strength greater than or equal to a first reference threshold, the processor 102 may estimate whether the vehicle is boarded based on the acquired specific area and the position information, and stop transmitting the first message based on the estimation of the boarding of the vehicle. Based on the program included in the memory 104, the operations may perform embodiments related to whether to transmit a safety message based on the estimation of the boarding of the vehicle based on the second message as described with reference to FIGS. 16 to 24.

Alternatively, a chipset including the processor 102 and the memory 104 may be configured. In this case, the chipset includes at least one processor and at least one memory operatively coupled to the at least one processor and configured to cause, when executed, the at least one processor to perform an operation. The operation may include measuring position information related to the UE, transmitting the first message, receiving a second message, and determining whether to stop transmitting the first message based on the position information and the second message. When information on a specific area is included in the second message received with a reception strength greater than or equal to a first reference threshold, it is estimated whether the vehicle is boarded based on the acquired specific area and the position information, and transmission of the first message may be stopped based on the estimation of the boarding of the vehicle. Also, based on the program included in the memory 104, the operations may perform embodiments related to whether to transmit a safety message based on the estimation of the boarding of the vehicle based on the second message as described with reference to FIGS. 16 to 24.

Alternatively, provided is a computer-readable storage medium including at least one computer program for causing the at least one processor to perform an operation. The operation may include measuring position information related to the UE, transmitting the first message, receiving a second message, and determining whether to stop transmitting the first message based on the position information and the second message. When information on a specific area is included in the second message received with a reception strength greater than or equal to a first reference threshold, it is estimated whether the vehicle is boarded based on the acquired specific area and the position information, and transmission of the first message may be stopped based on the estimation of the boarding of the vehicle. Also, based on the program included in the memory 104, the operations may perform embodiments related to whether to transmit a safety message based on the estimation of the boarding of the vehicle based on the second message as described with reference to FIGS. 16 to 24. In addition, the computer program may include programs capable of executing embodiments related to whether to transmit a safety message based on the estimation of whether the vehicle is boarded based on the second message, as described with reference to FIGS. 16 to 24.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 27:
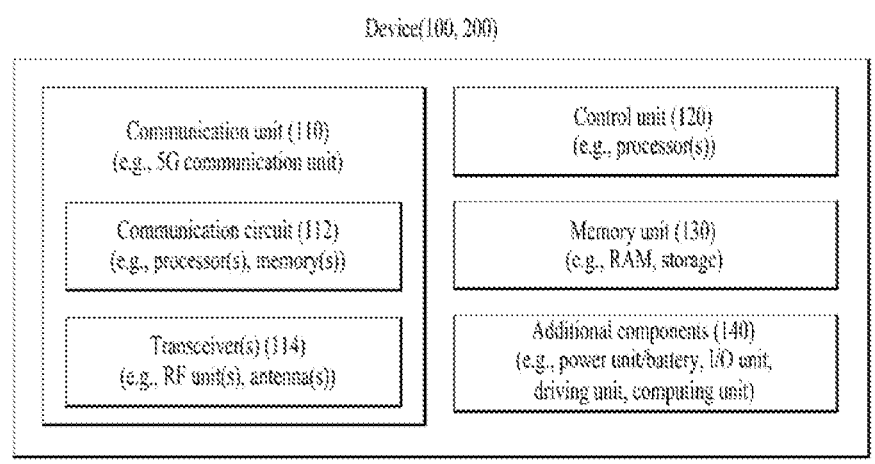
FIG. 27 illustrates another example of a wireless device to which the present disclosure is applied, wherein the wireless device may be implemented in various forms according to use-examples/services.

FIG. 27 illustrates another example of a wireless device applied to the present disclosure. The wireless device may be implemented in various forms according to a use-case/service (refer to FIG. 25)

Referring to FIG. 27, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Examples of Mobile Devices to which the Present Disclosure is Applied

Figure 28:
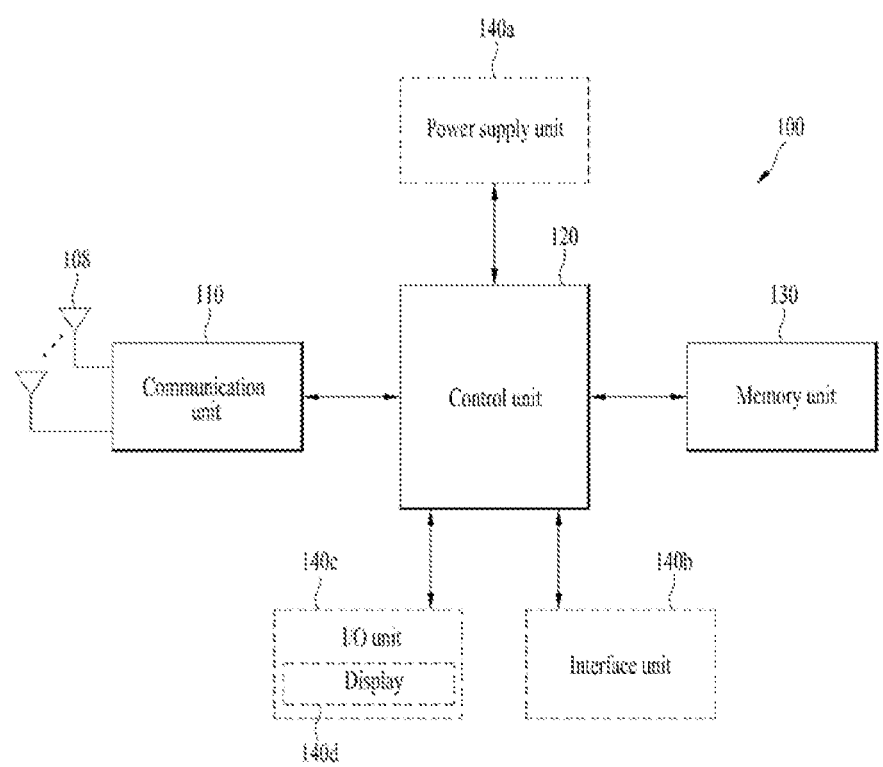
FIG. 28 illustrates a hand-held device applied to the present disclosure.

FIG. 28 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 30, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
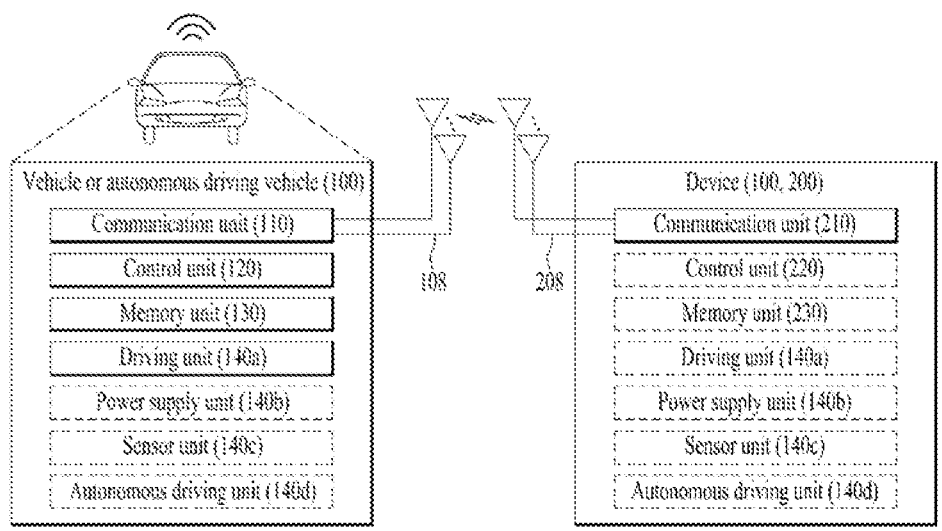
FIG. 29 illustrates a vehicle or an autonomous driving vehicle applied to the present disclosure.

Examples of Vehicles or Autonomous Vehicles to which the Present Disclosure is Applied FIG. 29 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for transmitting a first message by a user equipment (UE) in a wireless communication system supporting a sidelink, the method comprising:
transmitting a first message including status information of the UE; and
stopping transmission of the first message based on receipt of a second message related to vehicle boarding.

2. The method of claim 1, wherein the second message is a first beacon message including information on a specific region to which a location of the UE belongs.

3. The method of claim 1, wherein the second message is a first beacon message including information on a specific region to which a location of the UE belongs and received with a reception strength greater than or equal to a first reference threshold.

4. The method of claim 2, wherein the specific region is determined based on information on a reference location and range included in the first beacon message.

5. The method of claim 2, further comprising:
determining whether to resume transmission of the first message based on reception of a third message.

6. The method of claim 5, wherein the third message is a second beacon message including information on a specific region to which a location of the UE does not belong.

7. The method of claim 5, wherein the third message is a second beacon message that includes information on the specific region to which a location of the UE does not belong and is received with a reception strength less than a second reference threshold.

8. The method of claim 6, wherein the second beacon message includes the same beacon identifier (ID) as the first beacon message.

9. The method of claim 2, wherein the first message includes a personal safety message (PSM).

10. A user equipment (UE) for transmitting a first message in a wireless communication system supporting a sidelink, the UE comprising:
a radio frequency (RF) transceiver; and
a processor connected to the RF transceiver,
wherein the processor is configured to transmit a first message including status information of the UE, and stop the transmission of the first message based on receipt of a second message related to vehicle boarding.

11. The UE of claim 10, wherein the second message is a first beacon message including information on a specific region to which a location of the UE belongs.

12. The UE of claim 10, wherein the second message is a first beacon message including information on a specific region to which a location of the UE belongs and received with a reception strength greater than or equal to a first reference threshold.

* * * * *